(12) United States Patent
Conforti

(10) Patent No.: US 7,747,286 B2
(45) Date of Patent: Jun. 29, 2010

(54) WIRELESS ACCESS CONTROL SYSTEM WITH ENERGY-SAVING PIEZO-ELECTRIC LOCKING

(75) Inventor: Fred J. Conforti, Lisle, IL (US)

(73) Assignee: Harrow Products LLC, Montvale, NJ (US)

(*) Notice: Subject to any disclaimer, the term of this patent is extended or adjusted under 35 U.S.C. 154(b) by 1381 days.

(21) Appl. No.: 11/039,010

(22) Filed: Jan. 20, 2005

(65) Prior Publication Data

US 2005/0164749 A1  Jul. 28, 2005

Related U.S. Application Data

(60) Provisional application No. 60/537,922, filed on Jan. 20, 2004.

(51) Int. Cl.
   *H04B 1/38* (2006.01)
(52) U.S. Cl. ............... 455/565; 455/557; 455/575.1
(58) Field of Classification Search ......... 455/574, 455/572, 565, 41.2, 41.3, 418, 419, 41.1, 455/515, 557, 341, 186.1, 575.1, 90.3, 117; 70/279.1, 417, 277, 287.7; 340/5.7, 5.2, 340/5.8
   See application file for complete search history.

(56) References Cited

U.S. PATENT DOCUMENTS

| | | | |
|---|---|---|---|
| 528,589 A | 11/1894 | Brownell et al. | |
| 1,946,384 A | 2/1934 | Baril et al. | |
| 3,787,714 A | * 1/1974 | Resnick et al. | 361/172 |
| 3,967,478 A | 7/1976 | Guinn | |
| 4,048,630 A | 9/1977 | Deming et al. | |
| 4,539,555 A | 9/1985 | Tefka | |
| 4,557,121 A | 12/1985 | Charlton | |
| 4,579,376 A | 4/1986 | Charlton | |
| 4,634,155 A | 1/1987 | Geringer et al. | |
| 4,677,834 A | 7/1987 | Hicks | |
| D306,806 S | 3/1990 | Hill | |
| 4,967,478 A | 11/1990 | Sherman | |
| 5,009,456 A | 4/1991 | Eck | |
| 5,095,654 A | 3/1992 | Eccleston | |
| 5,148,691 A | 9/1992 | Walldén | |
| 5,263,347 A | 11/1993 | Allbaugh et al. | |
| 5,308,131 A | 5/1994 | Galindo et al. | |
| 5,313,812 A | 5/1994 | Eklund et al. | |
| 5,321,963 A | 6/1994 | Goldman | |
| 5,410,444 A | 4/1995 | Juds | |
| 5,475,375 A | 12/1995 | Barrett et al. | |
| 5,479,151 A | 12/1995 | Lavelle et al. | |

(Continued)

FOREIGN PATENT DOCUMENTS

FR  2749607  12/1997

(Continued)

*Primary Examiner*—Tan Trinh
(74) *Attorney, Agent, or Firm*—Michael Best & Friedrich LLP

(57) ABSTRACT

One aspect of the disclosed embodiment is a method and system for conserving battery life in a wireless access control system. This disclosed embodiment comprises a wireless access control system with a lock having an electronic controller and a piezo electronic driven locking mechanism. The electronic controller controls voltage to the piezo electronic locking mechanism. These and other features of the disclosed embodiment are discussed in the following detailed description of the disclosed embodiment.

11 Claims, 6 Drawing Sheets

U.S. PATENT DOCUMENTS

| | | |
|---|---|---|
| 5,491,471 A | 2/1996 | Stobbe |
| 5,531,086 A | 7/1996 | Bryant |
| 5,602,536 A | 2/1997 | Henderson et al. |
| 5,608,298 A | 3/1997 | Frolov et al. |
| 5,611,582 A | 3/1997 | Frolov et al. |
| 5,625,338 A | 4/1997 | Pildner et al. |
| 5,630,169 A | 5/1997 | Jackson |
| 5,677,682 A | 10/1997 | Thorsen et al. |
| 5,682,135 A | 10/1997 | LaBonde et al. |
| 5,683,127 A | 11/1997 | Chamberlain |
| 5,705,991 A | 1/1998 | Kniffin et al. |
| 5,712,973 A | 1/1998 | Dayan et al. |
| 5,722,276 A | 3/1998 | Aigner et al. |
| 5,729,198 A | 3/1998 | Gorman |
| 5,767,791 A | 6/1998 | Stoop et al. |
| 5,769,472 A | 6/1998 | Small |
| 5,774,059 A | 6/1998 | Henry et al. |
| 5,791,178 A | 8/1998 | Chamberlain et al. |
| D397,993 S | 9/1998 | Jimenez |
| 5,805,063 A | 9/1998 | Kackman |
| 5,808,296 A | 9/1998 | McMonagle et al. |
| 5,809,013 A | 9/1998 | Kackman |
| 5,823,028 A | 10/1998 | Mizuno et al. |
| 5,881,055 A | 3/1999 | Kondo |
| 5,907,279 A | 5/1999 | Bruins et al. |
| 5,933,086 A | 8/1999 | Tischendorf et al. |
| 5,936,544 A | 8/1999 | Gonzales et al. |
| 5,936,960 A | 8/1999 | Stewart |
| 5,940,771 A | 8/1999 | Gollnick et al. |
| 5,942,985 A | 8/1999 | Chin |
| 5,950,110 A | 9/1999 | Hendrickson |
| 5,970,227 A | 10/1999 | Dayan et al. |
| 6,005,306 A | 12/1999 | Pickard |
| 6,021,477 A | 2/2000 | Mann |
| 6,035,676 A | 3/2000 | Hudspeth |
| 6,038,896 A | 3/2000 | Chamberlain et al. |
| 6,067,297 A | 5/2000 | Beach |
| 6,072,402 A | 6/2000 | Kniffin et al. |
| 6,076,385 A | 6/2000 | Pedroso et al. |
| 6,108,108 A | 8/2000 | Peng |
| 6,108,188 A | 8/2000 | Denison et al. |
| 6,167,934 B1 | 1/2001 | Debroche |
| 6,177,861 B1 | 1/2001 | MacLellan et al. |
| 6,189,351 B1 | 2/2001 | Eagan et al. |
| 6,212,175 B1 | 4/2001 | Harsch |
| 6,259,352 B1 | 7/2001 | Yulkowski et al. |
| 6,285,295 B1 | 9/2001 | Casden |
| 6,297,725 B1 | 10/2001 | Tischendorf et al. |
| 6,330,817 B1 | 12/2001 | Frolov |
| 6,331,812 B1 * | 12/2001 | Dawalibi .................... 340/5.2 |
| 6,344,797 B1 | 2/2002 | Hosny |
| 6,347,486 B1 | 2/2002 | Badillet |
| 6,359,547 B1 | 3/2002 | Denison et al. |
| 6,392,537 B1 | 5/2002 | Tazumi et al. |
| 6,397,061 B1 | 5/2002 | Jordan et al. |
| RE37,784 E | 7/2002 | Fitzgibbon et al. |
| 6,420,961 B1 | 7/2002 | Bates et al. |
| 6,434,985 B1 | 8/2002 | Walmsley |
| 6,570,498 B1 | 5/2003 | Frost et al. |
| 6,624,750 B1 | 9/2003 | Marman et al. |
| 6,657,976 B1 | 12/2003 | Larghi |
| 6,665,520 B2 | 12/2003 | Romans |
| 6,668,606 B1 | 12/2003 | Russell et al. |
| 6,714,118 B1 | 3/2004 | Frolov et al. |
| 6,778,099 B1 | 8/2004 | Meyer et al. |
| 6,828,902 B2 | 12/2004 | Casden |
| 6,879,259 B1 | 4/2005 | Smith et al. |
| 6,956,840 B1 | 10/2005 | Proctor, Jr. |
| 6,958,976 B2 | 10/2005 | Kikkawa et al. |
| 6,967,562 B2 * | 11/2005 | Menard et al. ............. 340/5.64 |
| 7,526,934 B2 * | 5/2009 | Conforti .................... 70/279.1 |
| 2002/0177473 A1 | 11/2002 | Skinner et al. |
| 2002/0180582 A1 | 12/2002 | Nielsen |
| 2003/0025082 A1 | 2/2003 | Brewington et al. |
| 2003/0025095 A1* | 2/2003 | Sticht .................... 251/129.01 |
| 2003/0098778 A1* | 5/2003 | Taylor et al. ................ 340/5.61 |
| 2003/0100266 A1* | 5/2003 | Wiemeyer et al. .......... 455/67.3 |
| 2004/0124741 A1* | 7/2004 | Morrison et al. ............ 310/314 |
| 2004/0178909 A1* | 9/2004 | Lu .............................. 340/542 |

FOREIGN PATENT DOCUMENTS

| | | |
|---|---|---|
| WO | WO 02/25040 | 3/2002 |

\* cited by examiner

WIRELESS ACCESS CONTROL SYSTEM WITH ENERGY-SAVING PIEZO-ELECTRIC LOCKING

RELATED APPLICATIONS

The present application claims priority to the following applications: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194 entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; application Ser. No. 10/262,249, entitled "RF Dynamic Channel Switching Method" filed Sep. 30, 2002, and U.S. Provisional Patent Application No. 60/537,922, entitled "Wireless Access Control System With Energy-Saving Piezo-Electric Locking" filed Jan. 20, 2004.

BACKGROUND OF THE INVENTION

The preferred embodiments of the present invention relate to an RF access control system for controlling access to an access point. More specifically, the preferred embodiments of the present invention relate to a method and system for driving a motor of a motor-driven locking subsystem of an access control system in such a way as to save battery power of the motor-driven locking subsystem and ensure security by using a piezoelectric locking system.

A wireless access control system may provide several advantages over a traditional, wire-based access control system. In a traditional, wired access control system, each access point, such as a door, for example, is equipped with a locking module to secure the access point. Each locking module is in turn directly wired to a remote access control module. The access control module is typically a database that compares a signal received from the locking module to a stored signal in the database in order to determine an access decision for that locking module. Once the access decision has been determined by the access control module, the decision is relayed to the locking module through the wired connection.

The use of wired connections between the access control module and the locking module necessitates a large investment of time and expense in purchasing and installing the wires. For example, for larger installations, literally miles of wires must be purchased and installed. An access control system that minimizes the time and expense of the installation would be highly desirable.

Additionally, wire-based systems are prone to reliability and security failures. For example, a wire may short out or be cut and the locking module connected to the access control module by the wire may no longer be under the control of the access control module. If a wire connection is cut or goes, the only alternative is to repair the faulty location (which may not be feasible) or run new wire all the way from the access control module to the locking module, thus incurring additional time and expense. Conversely, an access control system that provides several available communication channels between the locking module and the access control module so that if one communication channel is not usable, communication may proceed on one of the other communication channels, would also be highly desirable, especially if such an access control system did not add additional costs to install the additional communication channels.

A wireless access system providing a wireless communication channel between the locking module and the access control module may provide many benefits over the standard, wire-based access control system. Such a wireless access system is typically less expensive to install and maintain due to the minimization of wire and the necessary installation time. Additionally, such a system is typically more secure because communication between the locking module and the access control module is more robust than a single wire.

However, one difficulty often encountered in installing and maintaining such a wireless access system is providing power to the individual, remote locking modules. For example, such locking modules may be powered by battery, but standard locking modules for wire-based access control systems are typically quite wasteful of power, a commodity in short supply in wireless access systems. Consequently, a motor driving the locking mechanism of the locking module that is power efficient is highly desirable.

Although motor driven locks typically use less energy than other types of locks (such as a solenoid driven latch, for example), motor driven locks still require a comparatively large draw of power, especially when powered by batteries. That is, driving the motor to lock and or unlock the latch mechanism still requires a great deal of energy. The large power draw drains the batteries at a fast rate, yielding a reduced number of times that a door with a motor driven locking mechanism may be locked/unlocked before the battery needs to be replaced or recharged.

Consequently, a simple, cost effective battery powered locking system that provides for conserving energy in order to maximize battery life would be highly desirable.

BRIEF SUMMARY OF THE INVENTION

One aspect of the disclosed embodiment is a method and system for conserving battery life in a wireless access control system. This disclosed embodiment comprises a wireless access control system with a lock having an electronic controller and a piezo electronic driven locking mechanism. The electronic controller drives the piezo electronic locking mechanism. These and other features of the disclosed embodiment are discussed in the following detailed description of the disclosed embodiment.

DETAILED DESCRIPTION OF THE INVENTION

The present application is directed toward a portion of a wireless access system. Additional disclosure of the wireless access system may be found in the following applications which are hereby incorporated by reference in their entirety: application Ser. No. 10/261,933, entitled "RF Channel Linking Method and System" filed Sep. 30, 2002; application Ser. No. 10/262,207, entitled "Energy Saving Motor-Driven Locking Subsystem" filed Sep. 30, 2002; application Ser. No. 10/262,509, entitled "Cardholder Interface for an Access Control System" filed Sep. 30, 2002; application Ser. No. 10/262,196, entitled "System Management Interface for Radio Frequency Access Control" filed Sep. 30, 2002; application Ser. No. 10/262,194, entitled "Power Management for Locking System" filed Sep. 30, 2002; application Ser. No. 10/262,507, entitled "General Access Control Features for a RF Access Control System" filed Sep. 30, 2002; application Ser. No. 10/262,077, entitled "RF Wireless Access Control for Locking System" filed Sep. 30, 2002; application Ser. No. 10/262,508, entitled "Maintenance/Trouble Signals for a RF Wireless Locking System" filed Sep. 30, 2002; and application Ser. No. 10/262,249, entitled "RF Dynamic Channel Switching Method" filed Sep. 30, 2002.

Figure 1:
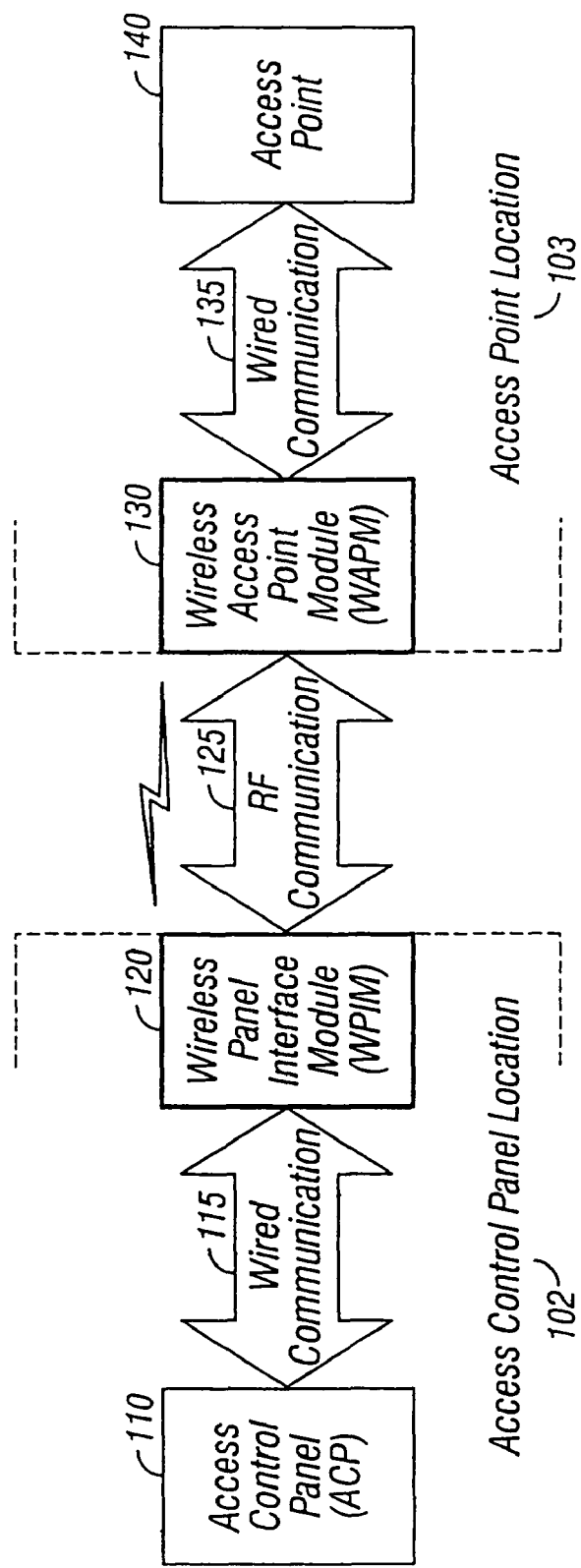
FIG. 1 illustrates a block diagram of the components of a wireless access system according to a preferred embodiment of the present invention.

FIG. 1 illustrates a block diagram of the components of a wireless access system 100 according to a preferred embodiment of the present invention. The wireless access system 100 includes several components installed at one of two generalized locations, an access control panel location 102 and an access point location 103. The access control panel location 102 includes an access control panel (ACP) 110 and a Wireless Panel Interface Module (WPIM) 120. The access point location 103 includes a Wireless Access Point Module (WAPM) 130 and an access point 140. The access control panel 110 communicates with the WPIM 120 through a bi-directional wired communication link 115. The WPIM 120 communicates with the WAPM 130 through a bi-directional RF communication link 125. The WAPM 130 communicates with the access point 140 through a bi-directional wired communication link 135. The access point 140 is preferably a door or portal, but may be a container, secure location, or a device of some kind, for example.

In operation, an access signal is read at the access point 140. The access signal may be a signal from an access card, for example, a magnetic stripe or Wiegand access card. Alternatively, the access signal may be a biometric or a numeric sequence or some other access signal. The access signal is relayed from the access point 140 to the WAPM 130 through the wired communication link 135. As further described below, the access point 140 may be integrated into the WAPM 130 to form a single component or may be a separate component wired to the WAPM 130.

Once the WAPM 130 receives the access signal from the access point 140, the WAPM 130 transmits the access signal to the WPIM 120 over the RF communication link 125. The WPIM 120 receives the access signal and relays the access signal to the ACP 110 over the wired communication link 115.

Figure 2:
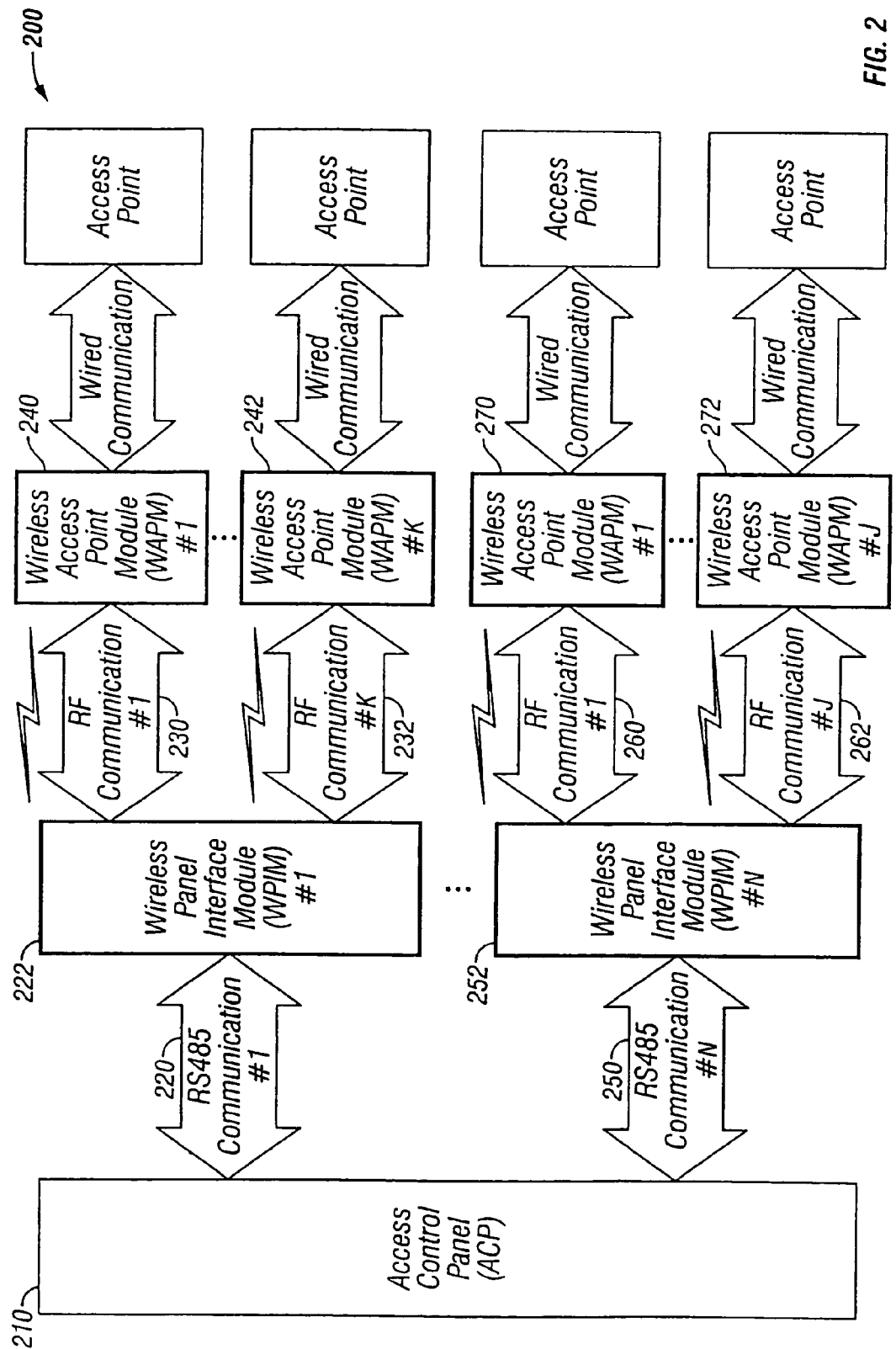
FIG. 2 illustrates a block diagram of the components of an expanded wireless access system according to a preferred embodiment of the present invention.

FIG. 2 illustrates a block diagram of the components of an expanded wireless access system 200 according to a preferred embodiment of the present invention. The expanded wireless access system 200 includes an ACP 210, multiple wired communication links 220, 222 numbered 1 to N, multiple WPIMs 222, 252 numbered 1 to N, multiple RF communication links 230, 232, 260, 262 numbered 1 to K and 1 to J, and multiple WAPMs 240, 242, 270, 272 numbered 1 to K and 1 to J. The expanded wireless access system 200 is similar to the access system 100 of FIG. 1, and includes the same components, but has been expanded to include multiple access points, WAPMs, and WPIMs.

In the expanded wireless access system 200, a single ACP 210 communicates with a number N of WPIMs 222, 252 over a number N of wired communication links 220, 250. That is, the ACP supports communication with and provides access decisions for plurality of WPIMs 222, 252. Each WPIM 222, 252 may in turn support a plurality of WAPMs 240, 242, 270, 272 each WAPM positioned at a single access point. For example, WPIM #1 communicates with a number K of WAPMs 240, 242 over a number K of RF communication links 230, 232. Additionally, WPIM #N communicates with a number J of WAPMs 270, 272 over a number J of RF communication links 260, 262.

In a preferred embodiment, the ACP 210 supports three WPIMs and each PIM can support up to six WAPMs. However, as more advanced and configurable systems are developed, the total numbers of WPIMs and WAPMs supported is expected to rise. Additionally, the N wired communication links 220, 250 are illustrated as the preferred embodiment of RS486 communication links. Alternatively, other well-known communication protocols may be employed.

Figure 3:
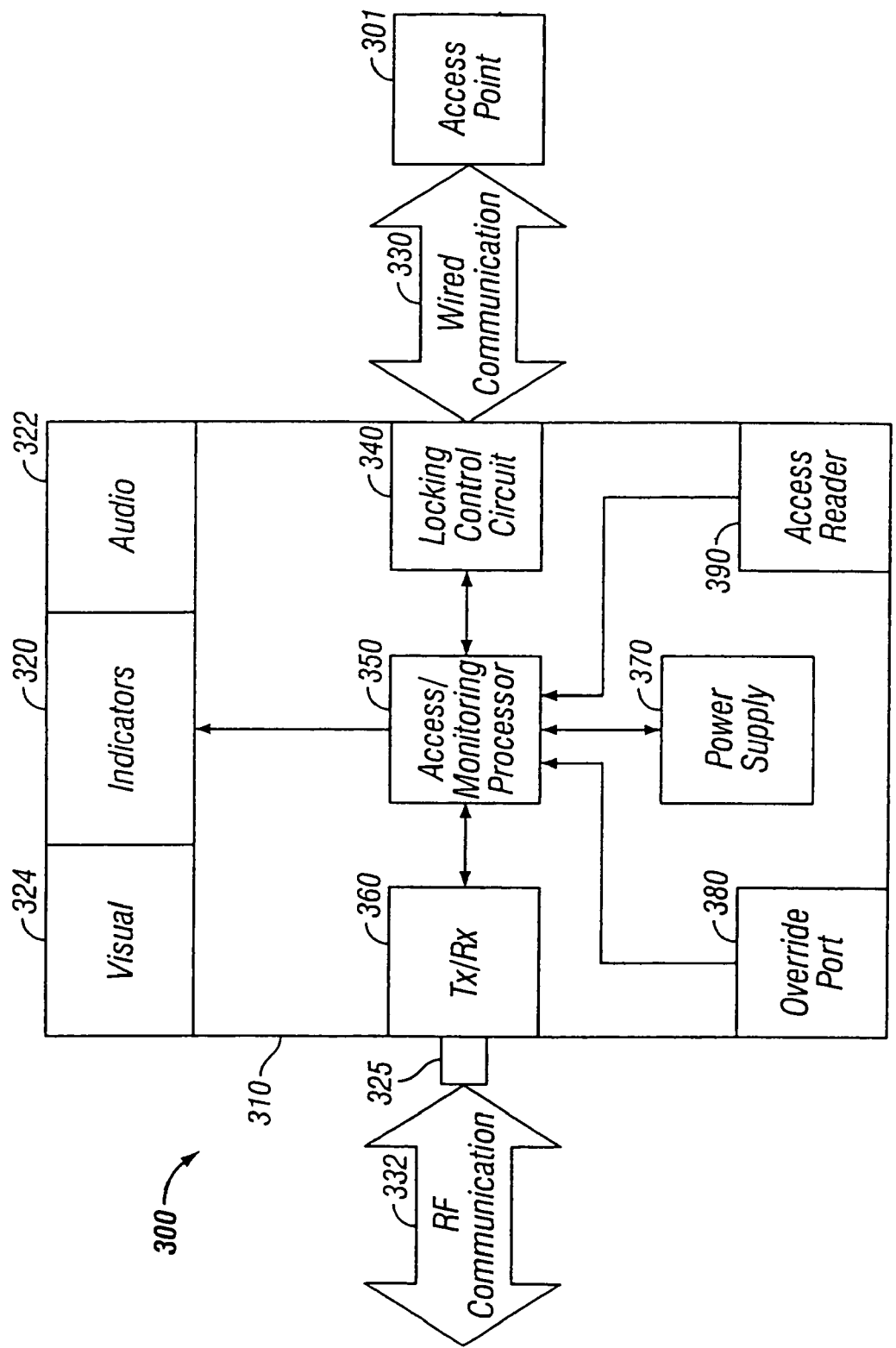
FIG. 3 illustrates a Wireless Access Point Module (WAPM) for the wireless access system of FIG. 1 according to a preferred embodiment of the present invention.

FIG. 3 illustrates a Wireless Access Point Module (WAPM) 300 for the wireless access system 100 of FIG. 1 according to a preferred embodiment of the present invention. The WAPM 300 includes a housing 310, indicators 320, a wired communication link 330, a RF communication link 332, and an antenna 325. The housing 310 includes a locking control circuit 340, an access/monitoring processor 350, a transceiver 360, a power supply 370, an override port 380, and an access reader 390. The indicators 320 may include one or both of an audio indicator 322 and a visual indicator 324. An access point 301 is also shown in FIG. 3.

The power supply 370 provides power to all of the other systems of the housing 310, including the transceiver 360, the locking control circuit 340, and the access/monitoring processor 350. The power supply 370 may be an internal battery or other internal type of power supply. Alternatively, an AC power supply may be employed. The transceiver 360 is coupled to the antenna 325 to allow signals to be sent and received from the housing 310 to an external point such as a WPIM through the RF communication link 332. The locking control circuit 340 is coupled to the access point 301 and provides locking control signals to the access point 301 through the wired communication link 330. Additionally, the locking control circuit 340 may receive feedback from the access point 301 through the wired communication link 330, for example to verify that the access point is secured. The access reader 390 receives access signals such as from an integrated card reader or other access device, for example. The indicators 320 may provide a visual or audio indication, for example, of the state of the WAPM 300 or that an access signal has been read by the access reader 390.

In operation, an access signal may be received from the access reader 390. The access signal is then relayed to the access/monitoring processor 350. The access/monitoring processor 350 then sends the access signal to the transceiver 360. The transceiver 360 transmits the access signal to WPIM 120 of FIG. 1 that is interfaced to the ACP 110. As further explained below, the ACP 110 includes a database of authorized access signals. If the access signal received from the WAPM 300 is determined by the ACP 110 to be a signal corresponding to an authorized user, a confirmation is transmitted from the ACP 110 to the WPIM 120 and then to the transceiver 360 of the WAPM 300. The confirmation is relayed from the transceiver 360 to the access/monitoring processor 350. The access/monitoring processor 350 then sends a locking control signal to the locking control unit 340. When the locking control unit 340 receives the locking control signal, the locking control unit 340 activates the access point 301 through the wired communication link 330 to allow access. The indicators 320 may be a visual or audible signal that the housing 310 has read an access signal, transmitted the access signal to the remote access control panel, received a confirmation, or activated the locking member, for example.

The WAPM 300 may include several variations. For example, the WAPM may be an Integrated Reader Lock (IRL), a Wireless Reader Interface (WRI), a Wireless Integrated Strike Interface (WISI), a Wireless Universal Strike Interface (WUSI), or a Wireless Portable Reader (WPR). The IRL includes an integrated access reader and lock. That is, the IRL is similar to FIG. 3, but includes the access point as part of the housing. The WRI is similar to the IRL, but does not include an integrated access reader and instead receives signals from a third party access reader. The WISI includes an integrated reader and lock and is mounted directly into the strike of the access point, such as a door, for example. The WUSI is similar to the WISI, but does not include an integrated reader and lock and may instead be connected to a third party reader and/or lock. The WPR is a portable reader that may be taken to a remote location and determine access decisions at the remote location, for example, for security checks or badging checks.

Figure 4:
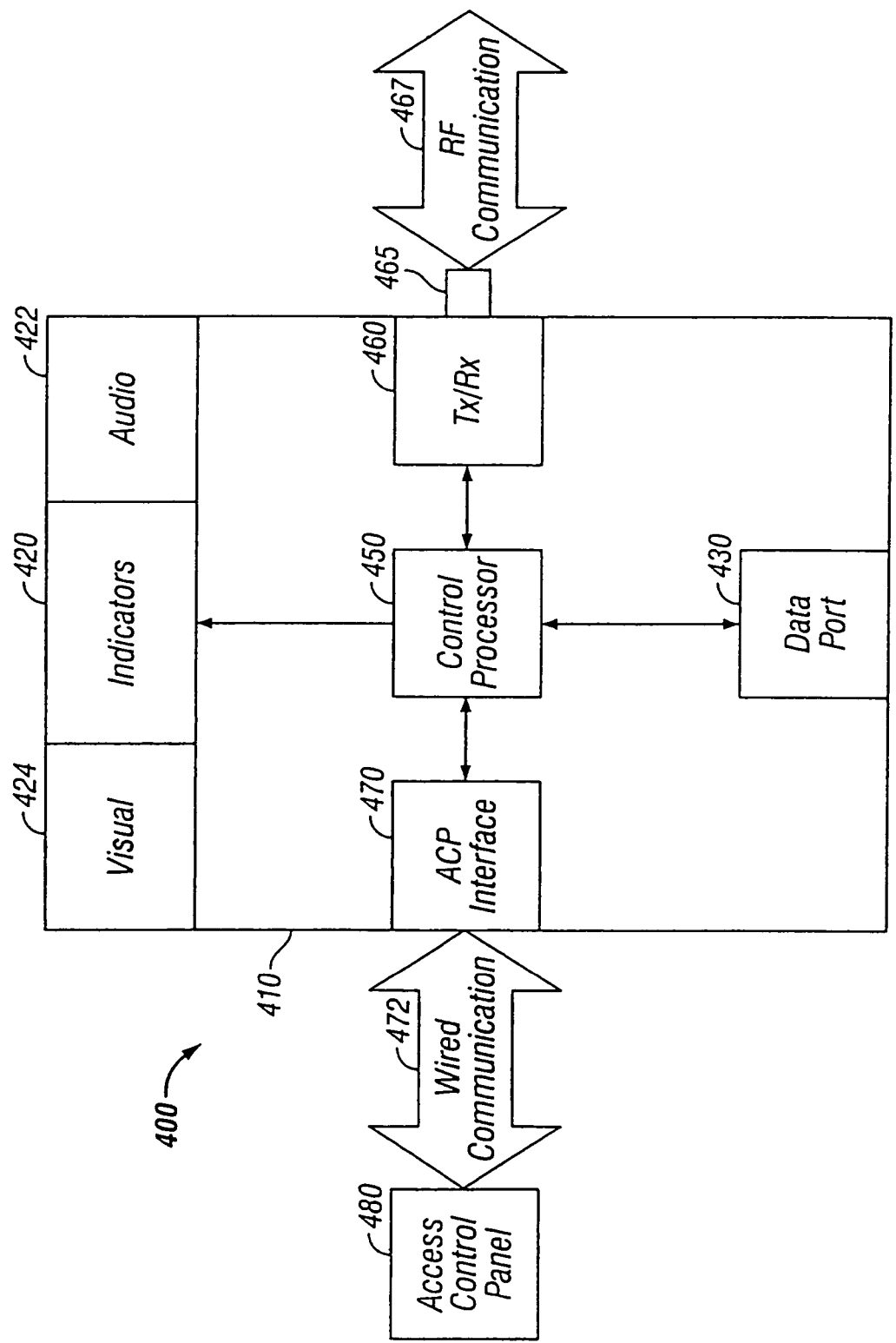
FIG. 4 illustrates a WPIM for the wireless access system of FIG. 1 according to a preferred embodiment of the present invention.

FIG. 4 illustrates a WPIM 400 for the wireless access system 100 of FIG. 1 according to a preferred embodiment of the present invention. The WPIM 400 includes a housing 410, an antenna 465, and indicators 420. The housing 410 includes a data port 430, a control processor 450, a transceiver 460 and an ACP interface 470. FIG. 4 also shows an RF communication link 467, a wired communication link 472, and an ACP 480.

Power is typically supplied to the WPIM via an AC power supply or through the wired communication 472. The transceiver 460 is coupled to the antenna 465 to allow signals to be sent and received from the housing 410 to an external point such as a WAPM through the RF communication link 467. The ACP 480 is coupled to the WPIM 400 through the wired communication link 472. The data port 430 is coupled to the control processor 450 to allow an external user such as a technician, for example, to interface with the control processor. The indicators 420 may provide a visual or audio indication, for example of the state of the WPIM 400 or that an access signal has been passed to the ACP 480 or an authorization passed to a WAPM 300.

In operation, the WPIM 400 receives access signals from the WAPM 300 through the antenna 465 and transceiver 460. The WPIM relays the access signals to the ACP 480 for decision making. Once the access decision has been made, the ACP 480 transmits the access decision through the wired communication link 472 to the WPIM 400. The WPIM 400 then transmits the access decision to the WAPM 300.

As mentioned above, the WPIM 400 includes a data port 430. The data port 430 is preferably an RS485 port. The data port 430 may be used, for example, by an operator to connect a computer to the WPIM 400 to perform various tasks, such as configuring the WPIM 400, for example. Some exemplary WPIM items for configuration include the transmission frequency for the communication link with the WAPM and the performance of the indicators 420.

Additionally, configuration information may be received by the data port 430 of the WPIM 400 and relayed to the WAPM 300 via the transceiver 460. The configuration information that is received by the WAPM 300 may then by relayed to the access/monitoring processor 350 of the WAPM 300 for implementation at the WAPM 300.

The WPIM may include several variations including a panel interface module (PI) and a panel interface module expander (PIME). As mentioned above, a single PIM may communicate with multiple WAPMs. Additionally, the housing for the PIM is preferably constructed to allow additional PIM modules to be installed in the PIM housing to form the PIME. Because the PIME includes multiple PIM modules, the PIME may service more access points.

The features of one of the preferred embodiments present a method and system for conserving battery life in an access control system. Thus, one aspect of a preferred embodiment of the present invention is an access system that employs a piezo electronic locking subsystem as further described below. The exemplary discussion below focuses on the use of the wireless access system 100 of FIG. 1 configured to provide access through a door. Although the access point below is presented as a door, it is only one example of the possible access points.

Figure 5:
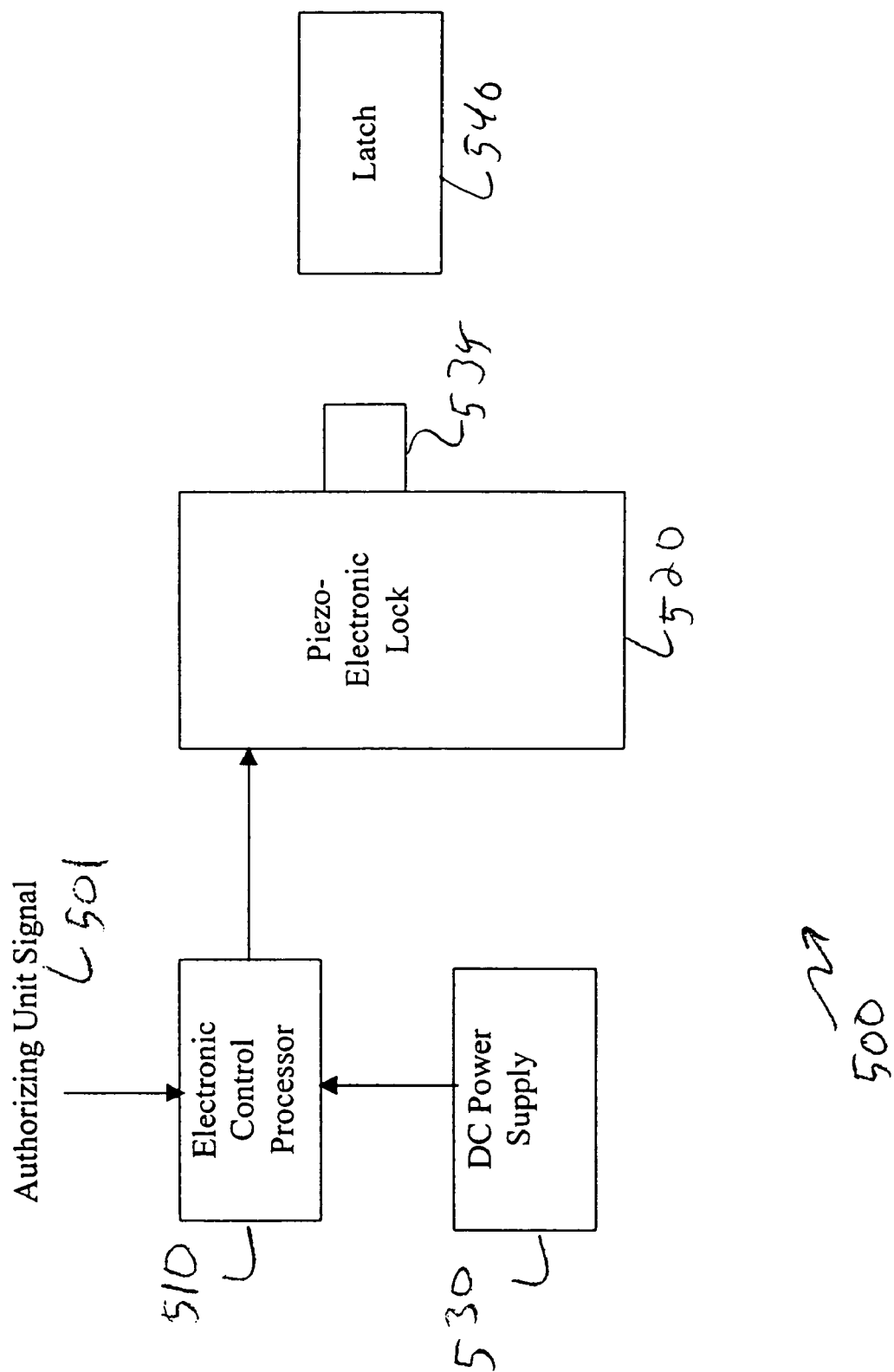
FIG. 5 is a schematic block diagram of a piezo-electronic locking subsystem according to a preferred embodiment of the present invention.

FIG. 5 is a schematic block diagram of a piezo-electronic locking subsystem 500 according to a preferred embodiment of the present invention. The piezo-electronic locking subsystem 500 includes an electronic control processor 510, a piezo-electric lock 520, a DC power supply 530, a bolt 535, and a latch 540. An authorizing unit signal 501 is also shown. The DC power supply is preferably a battery, but any device for supplying DC power may be substituted.

In operation, the electronic control processor 510 of the piezo-electronic locking subsystem 500 receives an authorizing unit signal 501. The authorizing unit signal 501 may be received from the locking control unit 340 of FIG. 3, for example, in response to a user access decision. The electronic control processor 510 then sends a command to the piezo-electric lock 520 in response to the received authorizing unit signal 501.

The piezo-electric lock 520 preferably includes an internal piezo-electric element as well as a positional displacement amplifier. The piezo-electric element may be any element having a physical dimension that varies when an electric voltage is applied across the element, such as a piezo-electric crystal, for example. The positional displacement amplifier is preferably in cooperation with the piezo-electric element and serves to increase the displacement arising when a voltage is applied cross the piezo-electric element. For example, the positional displacement amplifier may increase the displacement generated by the piezo-electric element by a factor of 10. The positional displacement amplifier is preferably connected to and used to position the bolt 535.

The piezo-electric lock 520 is preferably configured so that the piezo-electric lock 520 is in a locked position when voltage is applied to the piezo-electric element. That is, voltage applied across the piezo-electric element causes the piezo-electric element's shape to change and the change in shape is amplified by the positional displacement amplifier which drives the bolt 535 closed. When no voltage is applied to the piezo-electric element, the bolt 535 is not displaced. Consequently, the piezo-electric lock is open when no voltage is applied.

Alternatively, the polarity of the piezo-electric lock may be reversed so that the piezo-electric lock is in an open configuration when a voltage is applied and transitions to a locked configuration when no voltage is applied.

When the DC power supply 530 receives the command from the electronic control processor 510 to initiate a locking operation, the DC power supply 530 is enabled to apply a voltage across the piezo-electric element. The applied voltage causes the bolt 535 to be displaced into the latch 540 consequently locking the piezo-electric lock and securing the door.

To unlock the door, an authorizing unit signal 501 is sent to the electronic control processor 510. The electronic control processor 510 then removes the voltage applied to the piezo-electric element in the piezo-electric lock 520. Once the voltage is no longer supplied to the piezo-electric element, the piezo-electric element reverts to its original shape and the bolt 353 assumes an unlocked position.

Figure 6:
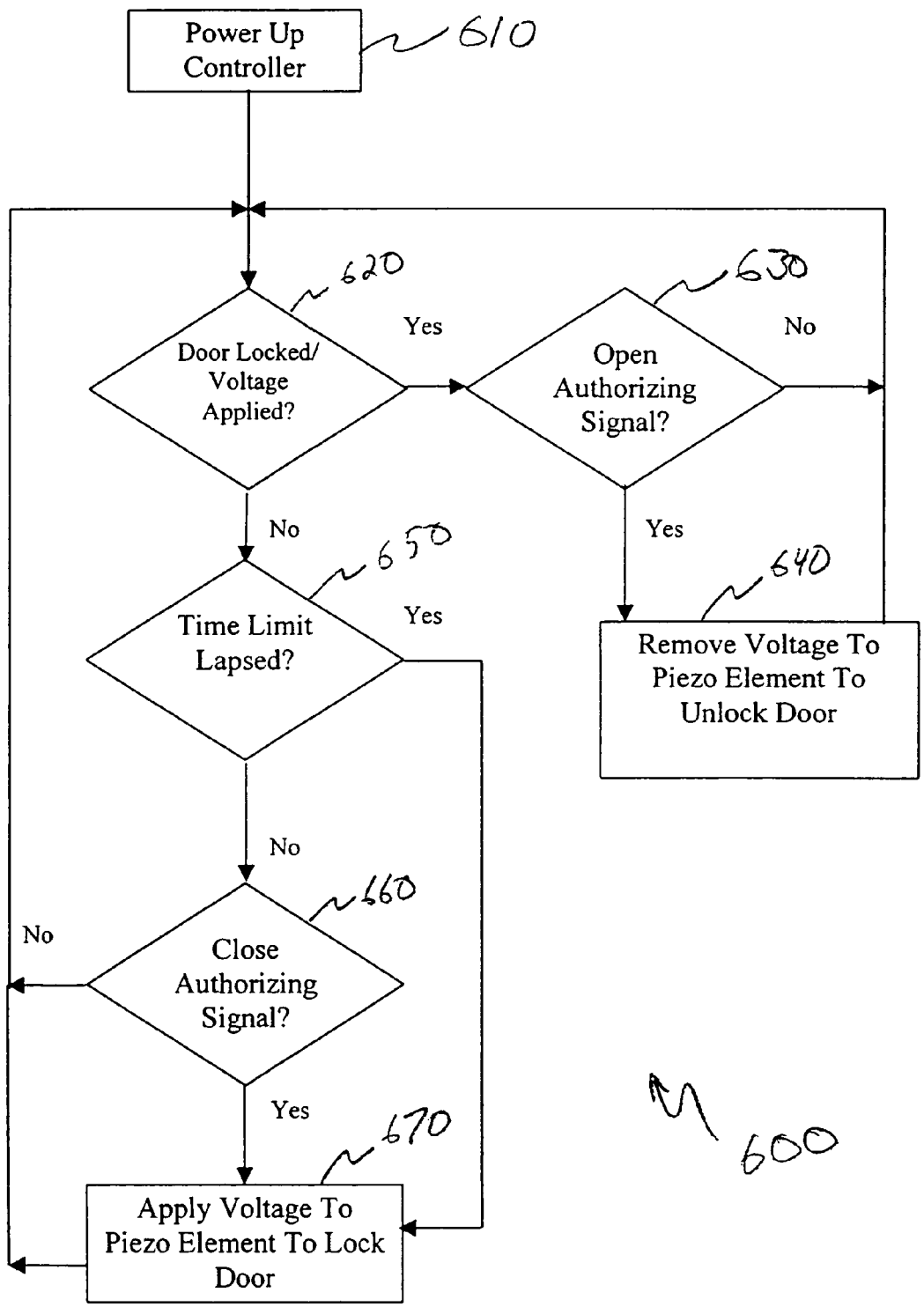
FIG. 6 illustrates a flowchart of the operation of the piezo-electronic locking subsystem of FIG. 5.

FIG. 6 illustrates a flowchart 600 of the operation of the piezo-electronic locking subsystem 500 of FIG. 5. The flowchart begins at step 610 when the piezo-electronic locking subsystem 500 is turned on. The flowchart then proceeds to step 620 and queries whether the door is currently locked. As mentioned above, the piezo-electric lock is preferably configured to assume a locked configuration when a voltage is applied to the lock. If the door is locked, the flowchart then proceeds to step 630. At step 630, the process queries whether an authorizing signal has been received by the piezo-electronic locking subsystem 500 in order to unlock or open the door. If no authorizing signal has been received, the process then proceeds back to step 620. Conversely, if an authorization signal has been received, the process proceeds to step 640 and the voltage is removed from the piezo-electric element in order to unlock the bolt. The process then proceeds back to step 620.

Returning to step 620, if the process determines that the door is unlocked, the process proceeds to step 650. At step 650, the process determines whether a pre-determined time limit has elapsed. That is, the piezo-electric lock is preferably configured to remain open only for a certain pre-determined time. After the predetermined time has lapsed, the piezo-electric lock preferably re-locks to secure the door. If the pre-determined time limit has elapsed at step 650, then the process proceeds to step 670 and a voltage is applied to the piezo-electric lock in order to lock the door.

If the pre-determined time limit has not elapsed at step 650, then the process proceeds to step 660. At step 660, the process queries whether an authorization signal has been received to lock the door. If no locking signal has been received, the process proceeds back to step 620. Conversely, if an authorization signal to lock the door has been received, the process proceeds to step 660 and the voltage is reapplied across the piezo-electric element in order to lock the door. The process then proceeds back to step 620.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. An RF access control system comprising:
    an access control panel;
    a panel interface module in electrical communication with the access control panel via a first communication link to deliver an access signal to the access control panel;
    an access point operable to read an access signal generated at an access point location;
    an access point module positioned adjacent the access point in electrical communication with the access point via a second communication link to receive the access signal from the access point, the access point module including an access reader to read the access signal from the access point, and an access processor in electrical communication with the access reader and in communication with the panel interface module to deliver the access signal to the access control panel;
    a locking control unit in communication with the access control panel to receive a locking control signal, the locking control unit coupled to and in communication with the access point to deliver the locking control signal to the access point; and
    an electronic locking subsystem positioned at the access point and in communication with the locking control unit to receive the locking control signal, the electronic locking subsystem including a piezo-electric lock having a piezo-electric element, a positional displacement amplifier, a bolt movable between a first position and a second position, and a power supply in communication with the piezo-electric lock to selectively apply a voltage across the piezo-electric lock to move the bolt between the first position and the second position in response to the locking control signal from the locking control unit.

2. The RF access control system of claim 1, wherein the access point module is in wireless communication with the panel interface module.

3. The RF access control system of claim 1, wherein the access control panel includes a database having authorized access signals, and wherein the bolt is movable to the second position in response to the locking control signal corresponding to one of the authorized access signals.

4. The RF access control system of claim 1, wherein the bolt moves from the first position to the second position when a non-zero voltage is applied by the power supply across the piezo-electric lock.

5. The RF access control system of claim 4, wherein the bolt moves to the second position when the non-zero voltage applied by the power supply across the piezo-electric lock is removed.

6. The RF access control system of claim 5, wherein the first position includes a locked position and the second position includes an unlocked position.

7. The RF access control system of claim 1, wherein the power supply includes a battery.

8. The RF access control system of claim 1, wherein the panel interface module includes a control processor and a data port coupled to the control processor to provide external access to the access point module via the control processor.

9. The RF access control system of claim 1, wherein the access point and the access point module form an integrated unit.

10. The RF access control system of claim 1, further comprising at least one of an audio indicator and a visual indicator operable to produce a user perceptible signal indicative of the access signal being read by the access reader.

11. The RF access control system of claim 1, wherein the positional displacement amplifier is connected to the bolt and is used to position the bolt.

* * * * *